United States Patent
Kobori

(10) Patent No.: US 10,279,468 B2
(45) Date of Patent: May 7, 2019

(54) INDUSTRIAL ROBOT FOR PERFORMING PROCESSING ON WORKS

(71) Applicant: SONY CORPORATION, Tokyo (JP)

(72) Inventor: Yuji Kobori, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/111,589

(22) PCT Filed: Mar. 3, 2015

(86) PCT No.: PCT/JP2015/001117
§ 371 (c)(1),
(2) Date: Jul. 14, 2016

(87) PCT Pub. No.: WO2015/151403
PCT Pub. Date: Oct. 8, 2015

(65) Prior Publication Data
US 2017/0008165 A1    Jan. 12, 2017

(30) Foreign Application Priority Data

Mar. 31, 2014 (JP) ................................. 2014-073638

(51) Int. Cl.
*B25J 9/00* (2006.01)
*B25J 9/06* (2006.01)
*B23P 19/04* (2006.01)

(52) U.S. Cl.
CPC ............ *B25J 9/0009* (2013.01); *B25J 9/0096* (2013.01); *B25J 9/06* (2013.01); *B23P 19/04* (2013.01);
(Continued)

(58) Field of Classification Search
CPC .............................. B25J 9/0009; B25J 9/0096
(Continued)

(56) References Cited

U.S. PATENT DOCUMENTS 5,125,298 A * 6/1992 Smith .................... B23P 19/006
29/798
5,216,969 A * 6/1993 Thomas ............... D05B 23/005
112/153
(Continued)

FOREIGN PATENT DOCUMENTS

DE   10-2006-000721 A1   8/2006
DE      102006000721 A1   8/2006
(Continued)

OTHER PUBLICATIONS

Office Action for CN Patent Application No. 201580003297.X, dated Feb. 2, 2018, 05 pages of Office Action and 06 pages of English Translation.
(Continued)

*Primary Examiner* — Jake Cook
*Assistant Examiner* — Bobby Rushing, Jr.
(74) *Attorney, Agent, or Firm* — Chip Law Group

(57) ABSTRACT

To reduce influence of vibrations resulting from operations of a robot and also ensure excellent workability in installation.
An industrial robot according to an embodiment of the present technology includes a robot main body, a first base, a second base, and a coupling frame. The first base includes a first upper end portion and a first bottom portion, the first upper end portion supporting the robot main body, the first bottom portion being provided on a floor surface. The second base includes a second upper end portion and a second bottom portion, a plurality of works processed by the robot main body being placed on the second upper end portion, the second bottom portion being provided on the floor surface. The coupling frame couples the first bottom portion and the second bottom portion to each other.

6 Claims, 14 Drawing Sheets

(52) U.S. Cl.
CPC ............ *Y10S 901/31* (2013.01); *Y10S 901/44* (2013.01); *Y10S 901/50* (2013.01)

(58) Field of Classification Search
USPC ............. 248/637, 638, 678; 108/51.11, 53.3; 414/749.1; 29/739, 742, 846
See application file for complete search history.

(56) References Cited

U.S. PATENT DOCUMENTS

| | | | | |
|---|---|---|---|---|
| 5,386,762 | A | 2/1995 | Gokey | |
| 7,044,066 | B1* | 5/2006 | Miller | B65D 19/44 108/54.1 |
| 8,074,431 | B1* | 12/2011 | Pierson | B65G 47/086 414/791.6 |
| 8,146,901 | B2* | 4/2012 | Mangelsen | B25J 9/0096 269/43 |
| 8,562,277 | B2* | 10/2013 | Criswell | B65G 67/08 414/398 |
| 8,912,459 | B2* | 12/2014 | Li | B07C 5/344 209/571 |
| 9,499,939 | B2* | 11/2016 | Medoff | C10L 5/442 |
| 2005/0191155 | A1* | 9/2005 | Sakiya | H01L 21/67017 414/217 |
| 2010/0180711 | A1* | 7/2010 | Kilibarda | B05B 15/0225 74/490.06 |
| 2012/0201633 | A1* | 8/2012 | Otogawa | H01L 21/67017 414/226.05 |
| 2012/0213625 | A1* | 8/2012 | Roberts | E04L 32/7433 414/788.1 |
| 2013/0086801 | A1* | 4/2013 | Mimura | B23P 21/00 29/720 |
| 2013/0312643 | A1* | 11/2013 | Osicki | B25H 1/02 108/27 |
| 2016/0288342 | A1* | 10/2016 | Akaha | B25J 21/00 |

FOREIGN PATENT DOCUMENTS

| | | |
|---|---|---|
| DE | 20-2010-008616 U1 | 3/2011 |
| DE | 202010008616 U1 | 3/2011 |
| EP | 1300219 A2 | 4/2003 |
| EP | 2671687 A2 | 12/2013 |
| JP | 05-309532 A | 11/1993 |
| JP | 2006-043844 A | 2/2006 |
| JP | 2012-030350 A | 2/2012 |
| JP | 2012-081582 A | 4/2012 |
| JP | 2012-164732 A | 8/2012 |
| JP | 2014-046423 A | 3/2014 |

OTHER PUBLICATIONS

Extended European Search Report of EP Patent Application No. 15772323.0, dated Dec. 12, 2017, 09 pages.

* cited by examiner

INDUSTRIAL ROBOT FOR PERFORMING PROCESSING ON WORKS

CROSS REFERENCE TO RELATED APPLICATIONS

This application is a U.S. National Phase of International Patent Application No. PCT/JP2015/001117 filed on Mar. 3, 2015, which claims priority to and the benefit of Japanese Patent Application No. JP 2014-073638 filed in the Japan Patent Office on Mar. 31, 2014. Each of the above-referenced applications is hereby incorporated herein by reference in its entirety.

TECHNICAL FIELD

The present technology relates to an industrial robot that performs predetermined processing on works, and to a base unit of the same.

BACKGROUND ART

For example, in production lines of optical disk apparatuses or electronic apparatuses having angular velocity detecting functions, industrial robots are used in test processes for evaluating functions of produced devices. Typically, such a robot includes a workbench on which a device to be tested (hereinafter, also described as work) is placed, a transfer robot that transfers the work to the workbench, a test unit that tests the work placed on the workbench, and the like.

In the test processes for works, vibrations resulting from operations of the transfer robot may have a large impact on test results. In this case, it has been necessary to stop operations of the transfer robot during the test of works. As a result, a cycle time in one test apparatus has been elongated, and it has been necessary to increase the number of test apparatuses in order to improve a tact time.

In order to solve such a problem, it is known to install a vibration isolation mechanism in the transfer robot or the test unit. However, in general, there is a problem that the vibration isolation mechanism itself is expensive. Additionally, due to the characteristics of the vibration isolation mechanism, a target object cannot be highly accurately positioned to be fixed thereto. This causes reduction in accuracy of transfer of works.

On the other hand, for example, Patent Document 1 discloses an assembling apparatus that fixes a base for supporting a robot and a base for supporting a camera to a floor surface mutually in a contactless manner, to enable positioning of a robot arm and a workpiece with high accuracy while reducing vibrations of the camera (see, for example, Patent Document 1).

Patent Document 1: Japanese Patent Application Laid-open No. 2012-30350

SUMMARY OF INVENTION

Problem to be Solved by the Invention

However, in the structure in which two bases are spatially separated as described in Patent Document 1, there are problems in ensuring accuracy of installation of both the bases at a start-up or at a change in line layout, increasing in quantity of work associated therewith, and the like.

In view of the circumstances as described above, it is an object of the present technology to provide an industrial robot and a base unit thereof, which are capable of reducing influence of vibrations resulting from operations of the robot and also ensuring excellent workability in installation.

Means for Solving the Problem

According to an embodiment of the present technology, there is provided an industrial robot including a robot main body, a first base, a second base, and a coupling frame.

The first base includes a first upper end portion supporting the robot main body, and a first bottom portion provided on a floor surface.

The second base includes a second upper end portion on which a plurality of works processed by the robot main body is placed, and a second bottom portion provided on the floor surface.

The coupling frame couples the first bottom portion and the second bottom portion to each other.

In the industrial robot, the first and second bases are coupled to each other by the coupling frame via the respective bottom portions. Thus, since a vibration transmission pathway from the first upper end portion to the second upper end portion is elongated, transmission of vibrations resulting from operations of the robot to the works is suppressed. Further, since the first and second bases are integrated via the coupling frame, excellent workability in installation is ensured.

According to an embodiment of the present technology, there is provided a base unit of an industrial robot, including a first base, a second base, and a coupling frame.

The first base includes a first upper end portion supporting a robot main body, and a first bottom portion provided on a floor surface.

The second base includes a second upper end portion on which a plurality of works processed by the robot main body is placed, and a second bottom portion provided on the floor surface.

The coupling frame couples the first bottom portion and the second bottom portion to each other.

Effects of the Invention

As described above, according to the present technology, it is possible to reduce influence of vibrations resulting from operations of a robot and also ensuring excellent workability in installation.

It should be noted that the effects described here are not necessarily limited and any of the effects described herein may be produced.

MODE(S) FOR CARRYING OUT THE INVENTION

Hereinafter, an embodiment according to the present technology will be described with reference to the drawings.

Figure 1:
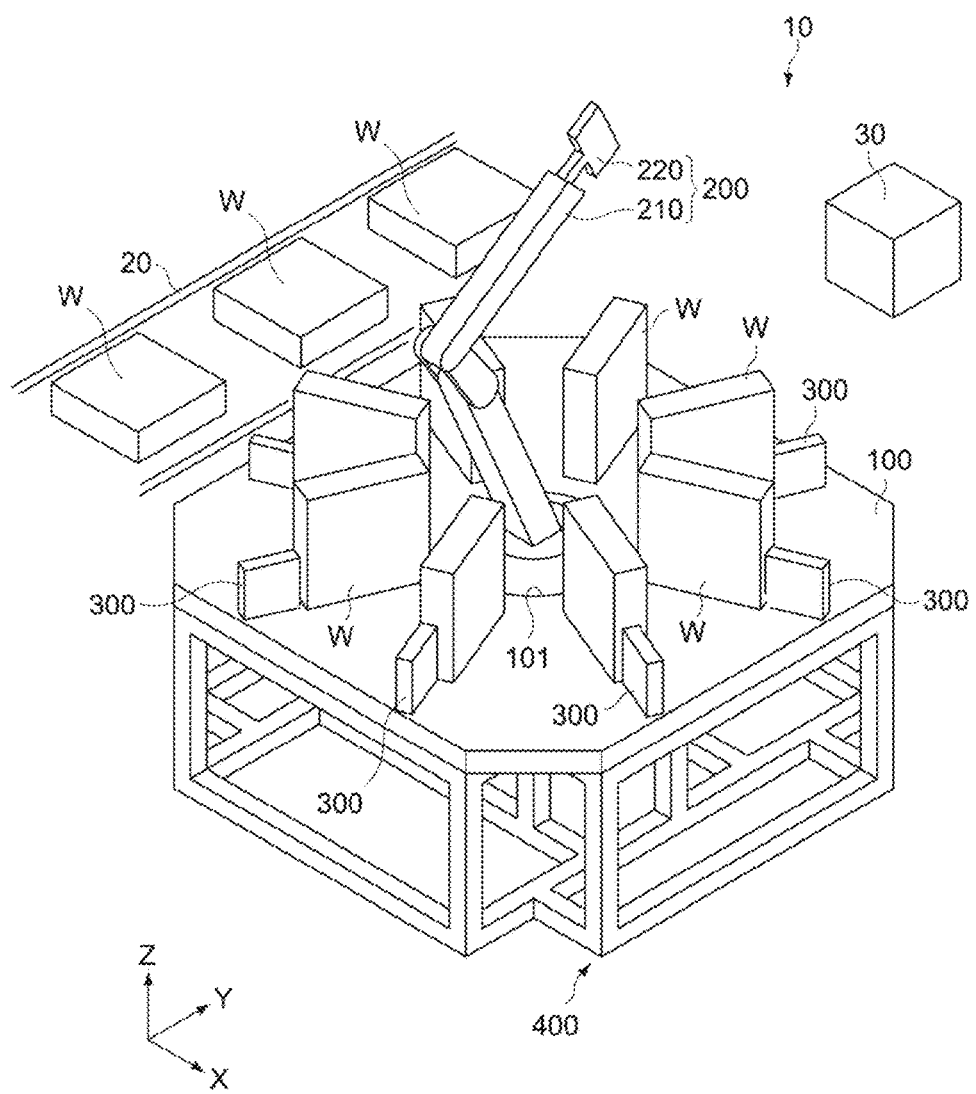
FIG. 1 is a schematic perspective view of a test apparatus as an industrial robot according to one embodiment of the present technology.

FIG. 1 is a schematic perspective view of a test apparatus 10 as an industrial robot according to one embodiment of the present technology. The test apparatus 10 is used in a product test process in the production line of electronic apparatuses (hereinafter, also described as works).

[Entire Configuration of Test Apparatus]

The test apparatus 10 is provided adjacently to a transfer line 20 for works W. The test apparatus 10 includes a work table 100, a robot main body 200, and a plurality of test units 300.

An opening portion 101 that houses the robot main body 200 is provided at the center portion of the work table 100. The test units 300 are disposed at regular intervals so as to surround the opening portion 101 and are electrically connected to the respective works W placed on the work table 100 to evaluate predetermined electrical operations of the respective works W. The robot main body 200 transfers the works W one by one between the transfer line 20 and the work table 100. The robot main body 200 sequentially transfers the works W from the transfer line 20 to predetermined positions on the work table 100, and sequentially transfers the tested works W from the work table 100 to the transfer line 20.

Operations of the robot main body 200 and the plurality of test units 300 are controlled by a controller 30. The controller 30 is typically constituted by a computer. The controller 30 may control the robot main body 200 to transfer the works W to different positions in accordance with evaluation results of the works W by the plurality of test units 300. Further, the controller 30 may be configured to control the operation of the transfer line 20, in addition to the robot main body 200 and the plurality of test units 300. It should be noted that the controller 30 may be configured as a part of the test apparatus 10.

Various test apparatuses are used for the test units 300 in accordance with the type of works W or content of a test. For example, in the case where the work W is an electronic apparatus containing precision moving parts, such as an optical disk apparatus, a test apparatus that evaluates an optical pick-up operation is used. In the case where the work W is an electronic apparatus having an image stabilizing function, such as a digital camera, a test apparatus that evaluates an output of a motion sensor such as an angular velocity sensor is used.

The types of works W and the shapes thereof are not particularly limited. In this embodiment, as the works W, optical disk apparatuses each having the shape of a substantially rectangular parallelepiped in planar view are used. As shown in FIG. 1, the works W are placed in a lying posture on the transfer line 20 and placed in an upright posture on the work table 100. It should be noted that the posture of the works W is not limited to the above and can be appropriately set in accordance with configurations of a transfer apparatus and a test apparatus.

The test apparatus 10 includes a base unit 400 that commonly supports the work table 100 and the robot main body 200. The base unit 400 includes a first base 41 and a second base 42. The first base 41 supports the robot main body 200. The second base 42 supports the work table 100.

[Base Unit]

Figure 2:
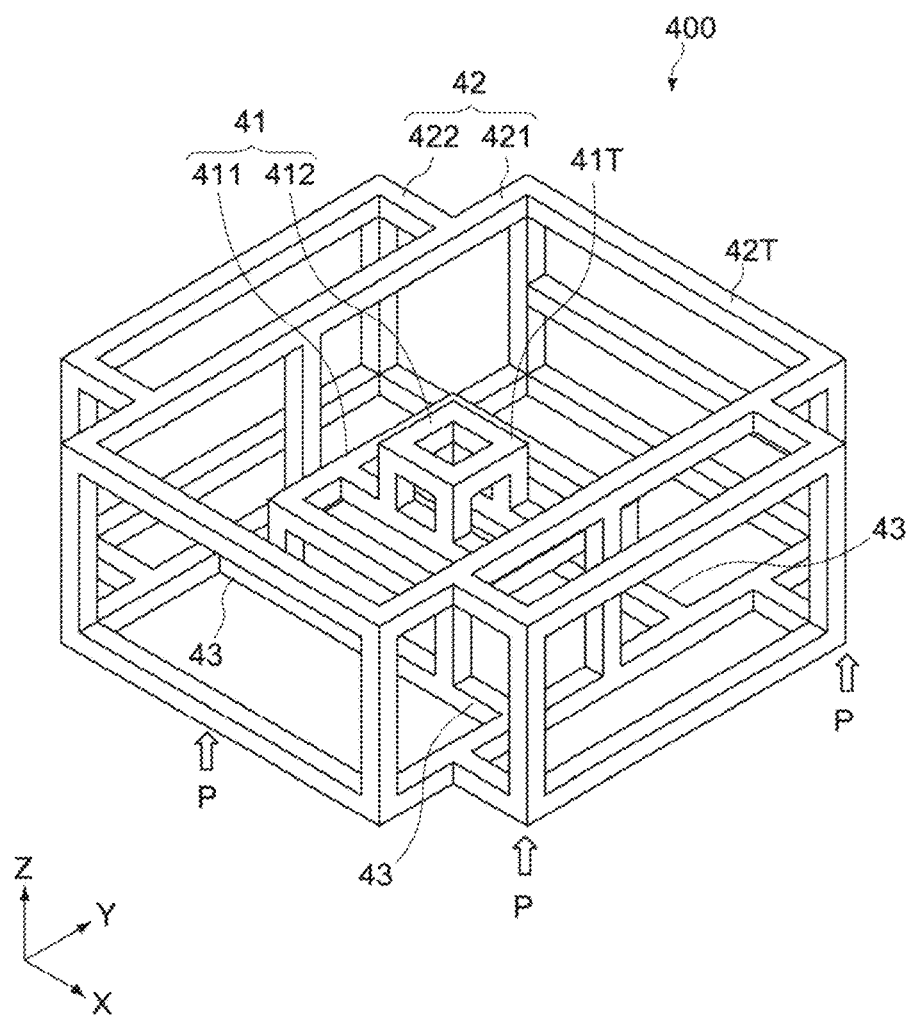
FIG. 2 is a schematic perspective view showing the entire base unit in the test apparatus.
Figure 3:
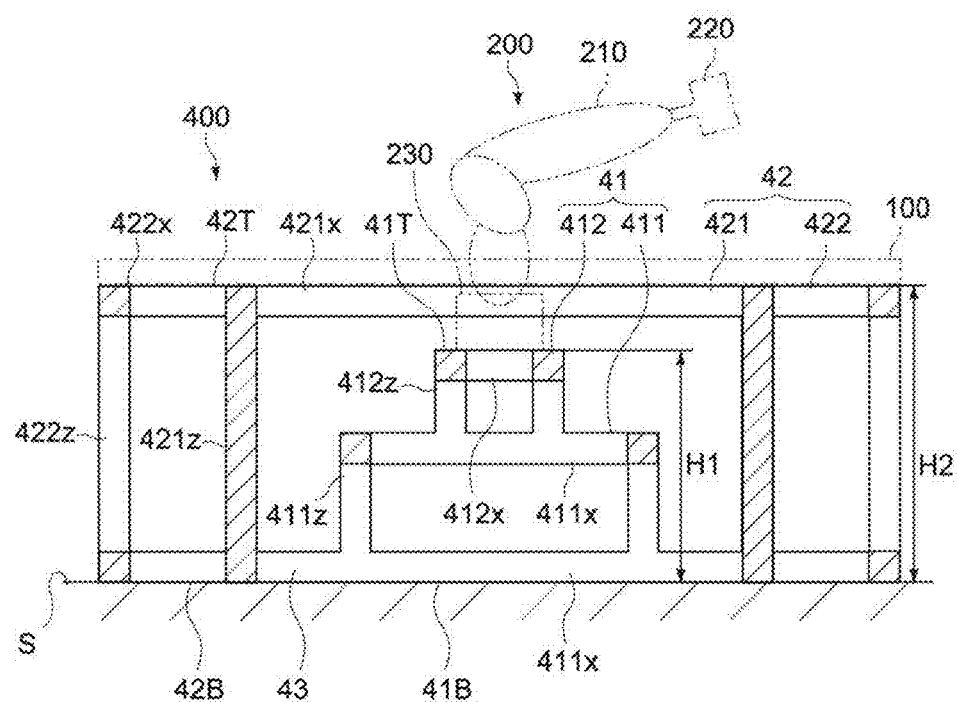
FIG. 3 is a cross-sectional view of the base unit when viewed from a front direction.
Figure 3:
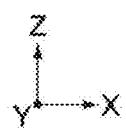
Figure 4:
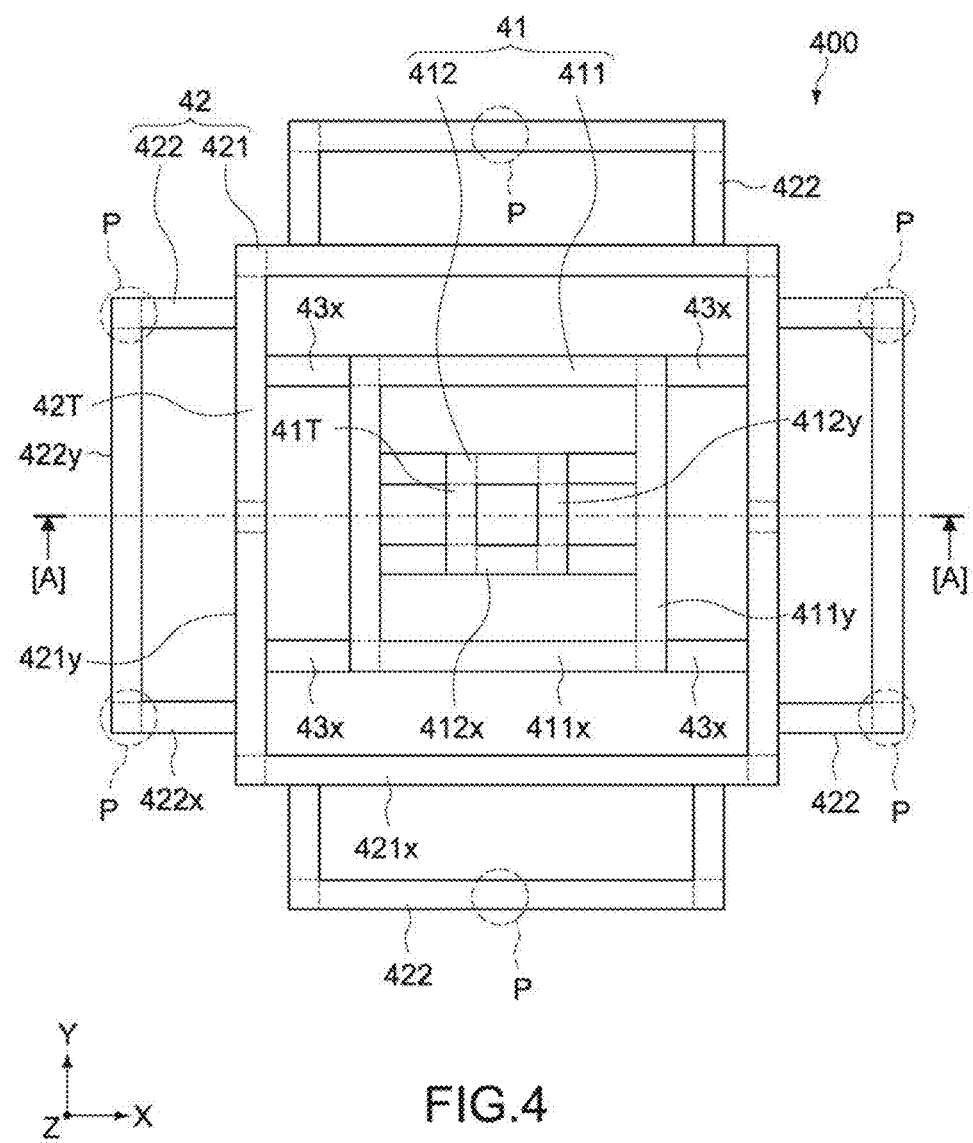
FIG. 4 is a plan view of the base unit.

FIG. 2 is a schematic perspective view showing the entire base unit 400. FIG. 3 is a cross-sectional view of the base unit 400 when viewed from a front direction (cross-sectional view taken along the line [A]-[A] in FIG. 4). FIG. 4 is a plan view of the base unit 400. In each figure, X- and Y-axis directions represent horizontal directions that are orthogonal to each other, and a Z-axis direction represents a height direction that is orthogonal to the X- and Y-axis directions.

The base unit 400 is constituted by a three-dimensional metal frame body having a framework structure. The height of the base unit 400 is set such that the robot main body 200 and the work table 100 can be provided at positions having predetermined heights H1 and H2 (see FIG. 3) from a floor surface S.

The base unit 400 includes the first base 41, the second base 42, and a coupling frame 43.

(First Base)

The first base 41 is constituted by a three-dimensional metal frame body. The first base 41 includes a first upper end portion 41T and a first bottom portion 41B. The first upper end portion 41T supports the robot main body 200. The first bottom portion 41B is provided on the floor surface S.

The first base 41 further has a structure in which a first base frame 411 and a second base frame 412 are combined.

The first base frame 411 has a framework structure including the first bottom portion 41B. In other words, the first base frame 411 includes a plurality of shaft members 411$x$ extending in the X-axis direction, a plurality of shaft members 411$y$ extending in the Y-axis direction, and a plurality of shaft members 411$z$ extending in the Z-axis direction, and is constituted by a three-dimensional frame body in which those shaft members are mutually combined. The first bottom portion 41B is constituted by a frame surface that is parallel to the floor surface S.

The second base frame 412 has a framework structure including the first upper end portion 41T. In other words, the second base frame 412 includes a plurality of shaft members 412$x$ extending in the X-axis direction, a plurality of shaft members 412$y$ extending in the Y-axis direction, and a plurality of shaft members 412$z$ extending in the Z-axis direction, and is constituted by a three-dimensional frame body in which those shaft members are mutually combined. The first upper end portion 41T is constituted by a frame surface that is parallel to the floor surface S.

The shaft members 412$x$, 412$y$, and 412$z$ that constitute the second base frame 412 each have a shaft length shorter than the shaft members 411$x$, 411$y$, and 411$z$ that constitute the first base frame 411. The second base frame 412 configured as described above is provided at the upper center of the first base frame 411.

The first base frame 411 and the second base frame 412 are coupled to or integrated with each other by fixing the plurality of shaft members with use of bolts, welding the plurality of shaft members, or the like. The length, cross-sectional shape, thickness, and the like of each shaft member are not particularly limited and are designed so as to obtain predetermined rigidity and strength capable of stably supporting the robot main body 200.

The robot main body 200 is provided at the upper end portion 41T of the first base 41 so as to protrude upward from the opening portion 101 of the work table 100. A certain gap exists between the opening portion 101 and the robot main body 200. The robot main body 200 operates so as not to come into contact with the work table 100.

In this embodiment, the second base frame 412 is configured to be attachable to and detachable from the first base frame 411. In this case, the second base frame 412 is detached from the first base frame 411 together with the robot main body 200. This makes it possible to optimize the configuration of the second base frame 412 in accordance with the type of the robot main body 200.

(Second Base)

The second base 42 is constituted by a three-dimensional metal frame body, similarly to the first base 41. The second base 42 includes a second upper end portion 42T and a second bottom portion 42B. The second upper end portion 42T supports the work table 100. The second bottom portion 42B is provided on the floor surface S.

The second base 42 has a framework structure including the second bottom portion 42B and the second upper end portion 42T and is configured so as to surround the first base 41. The second bottom portion 42B and the second upper end portion 42T are each constituted by a frame surface that is parallel to the floor surface S. In this embodiment, the second base 42 includes a main body frame portion 421 and a plurality of auxiliary frame portions 422.

The main body frame portion 421 includes a plurality of shaft members 421$x$ extending in the X-axis direction, a plurality of shaft members 421$y$ extending in the Y-axis direction, and a plurality of shaft members 421$z$ extending in the Z-axis direction, and is constituted by a frame body having the shape of a parallelepiped, in which those shaft members are mutually combined.

The shaft members 421$x$, 421$y$, and 421$z$ that constitute the main body frame portion 421 each have a shaft length longer than the shaft members 411$x$, 411$y$, and 411$z$ that constitute the first base frame 411. In this embodiment, the shaft members 421$z$ along the Z-axis direction each have a shaft length longer than the sum of the length of the shaft member 411$z$ of the first base frame 411 and the length of the shaft member 412$z$ of the second base frame 412.

The auxiliary frame portions 422 are provided on the respective four side surfaces of the main body frame portion 421. Each of the auxiliary frame portions 422 includes a plurality of shaft members 422$x$ extending in the X-axis direction, a plurality of shaft members 422$y$ extending in the Y-axis direction, and a plurality of shaft members 422$z$ extending in the Z-axis direction, and is constituted by a frame body having the shape of a parallelepiped, in which those shaft members are mutually combined.

The upper surfaces of the auxiliary frame portions 422 and the upper surface of the main body frame portion 421 are configured to be flush with one another. This provides the second upper end portion 42T. Bolt fastening holes for fixing the work table 100 are provided at appropriate positions of the second upper end portion 42T.

On the other hand, the lower surfaces of the auxiliary frame portions 422 and the lower surface of the main body frame portion 421 are formed to be flush with one another. This provides the second bottom portion 42B. The second bottom portion 42B is fixed to the floor surface S via a plurality of anchor bolts (not shown). The positions fixed with those anchor bolts are not particularly limited. For example, in FIG. 4, the base unit 400 is fixed to the floor surface S at a plurality of fixation positions on the auxiliary frame portions 422, which are indicated by reference symbol P.

The main body frame portion 421 and the auxiliary frame portions 422 are coupled to or integrated with each other by fixing the plurality of shaft members with use of bolts, welding the plurality of shaft members, or the like. The length, cross-sectional shape, thickness, and the like of each shaft member are not particularly limited and are designed so as to obtain predetermined rigidity and strength capable of stably supporting the work table 100.

(Coupling Frame)

The coupling frame 43 is constituted by a plurality of shaft members that couples the first bottom portion 41B and the second bottom portion 42B to each other. The first bottom portion 41B and the second bottom portion 42B are formed on the same flat surface. The coupling frame 43 is constituted by a plurality of shaft members parallel to the flat surface. In this embodiment, as shown in FIG. 4, the coupling frame 43 is constituted by a plurality of shaft members 43$x$ extending in the X-axis direction, but instead thereof or in addition thereto, the coupling frame 43 may be constituted by a plurality of shaft members extending in the Y-axis direction.

The shaft members 43$x$ that constitute the coupling frame 43 may be constituted by independent shaft members or may be commonly constituted by the shaft members that constitute the first base 41 or the second base 42. In this embodiment, the shaft members 43$x$ are constituted by the common shaft members with the shaft members 411$x$ that constitute the first bottom portion 41B. The shaft members 43$x$ are integrally jointed to the shaft members 421$y$ of the main body frame portion 421 by being fastened with bolts or being welded, the shaft members 421$y$ constituting the second bottom portion 42B.

Since the coupling frame 43 is provided between the first bottom portion 41B and the second bottom portion 42B, the multiple shaft members constituting the first and second bases 41 and 42 intervene from the first upper end portion 41T to the second upper end portion 42T. This makes it possible to maximize the length of a vibration transmission pathway extending from the first upper end portion 41T, which supports the robot main body 200, to the second upper end portion 42T, which supports the work table 100. Therefore, vibrations generated in association with an operation such as turn or expansion and contraction of the robot main body 200 are unlikely to be transmitted to the work table 100 on which the works W and the test units 300 are placed. This enables functional evaluation of the works W to be performed stably and properly.

In particular, in this embodiment, the first base 41 has a structure in which the first and second base frames 411 and 412 are combined, and is constituted such that the second base frame 412 is narrower in width than the first base frame 411. Thus, a distance in which vibrations reach the coupling frame 43 from the first upper end portion 41T as a vibrating surface is extended by a distance in which the vibrations pass through the shaft members 411$x$ and 411$y$. This makes it possible to enhance the rigidity and strength of the first base 41 and also further improve a function of inhibiting vibration transmission to the work table 100.

Figure 5:
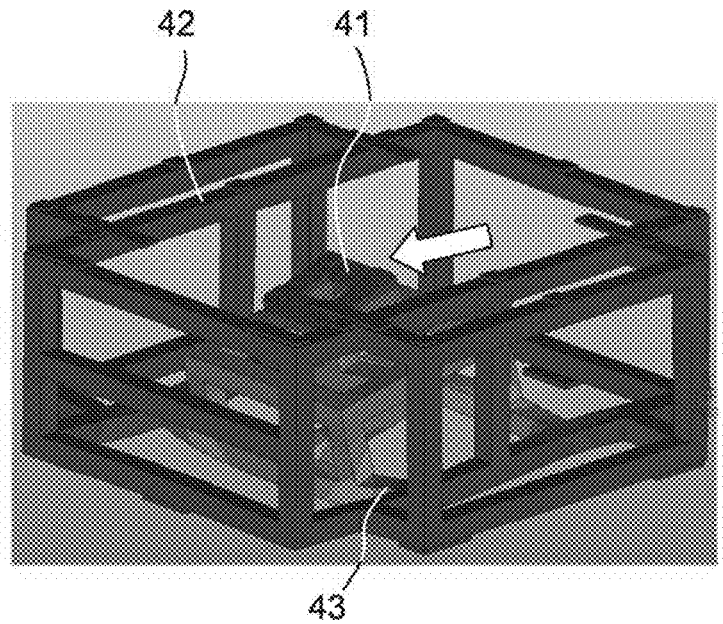
FIG. 5 is a simulation result showing a state of deformation when a static load is applied to a vibrating surface of the base unit.
Figure 6:
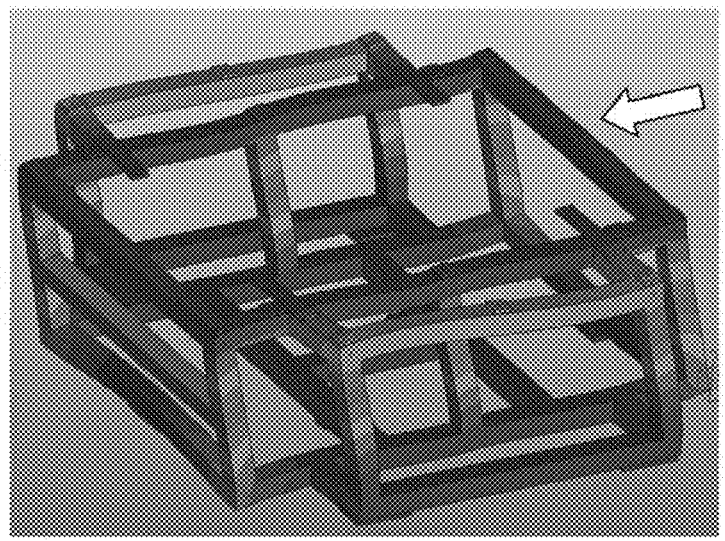
FIG. 6 is a simulation result showing a state of deformation when a static load is applied to a vibrating surface of a base unit according to a comparative example.

FIGS. 5 and 6 are each a simulation result showing a state of deformation when a static load of a predetermined amount is applied to two bases having different configurations in a direction indicated by an outlined arrow.

FIG. 5 is a simulation result corresponding to a base structure of this embodiment and shows a state when a static load is applied to an upper end of the first base 41 in a horizontal direction. As shown in FIG. 5, the deformation remains within the first base 41, the coupling frame 43, and the bottom portion of the second base 42 and is not found at the upper end of the second base 42.

On the other hand, FIG. 6 is a simulation result corresponding to a base structure according to a comparative example. In this comparative example, there is provided a base structure of a test apparatus, in which works, a test apparatus, and a transfer robot are provided on a common table. A state of deformation when the static load is applied to an upper end of the base, which is the same as the second base, in the horizontal direction was measured. As a result, as shown in FIG. 6, the deformation extends to the entire base. In particular, the deformation of the upper end that supports the table was significant. From this, superiority of this embodiment is easily presumed.

Additionally, according to this embodiment, since the bottom portion 42B of the second base 42 is fixed to the floor surface S with use of the plurality of anchor bolts, an effect of disconnecting the vibration transmission pathway can be produced at the positions fixed to the floor surface S. In particular, in the first and second bases 41 and 42, the positions fixed with the anchor bolts are set immediately below the shaft members (supporting columns) extending in the Z-axis direction, so that the above effect can be more prominently exerted. It should be noted that the same effect as that described above can be produced by setting the positions fixed with the anchor bolts to the coupling frame 43.

As described above, according to the base unit 400 of this embodiment, the functional evaluation described above can be adequately performed even during the transfer of the works W by the robot main body 200. This enables a cycle time per test apparatus to be shortened. Further, the number of test apparatuses for achieving a desired tact time can be reduced.

Further, in the base unit 400 of this embodiment, since the first base 41 and the second base 42 are integrated with each other via the coupling frame 43, for example, desired accuracy of installation of both the bases 41 and 42 can be ensured at the start-up of the apparatus or at a change in line layout. This makes it possible to enhance workability of installation of the base unit, compared with the case where the two bases are separated from each other.

[Robot Main Body]

Subsequently, the details of the robot main body 200 will be described.

As shown in FIG. 1, the robot main body 200 includes an articulated arm 210, a hand portion 220 connected to the tip portion of the articulated arm 210, and a drive unit 230 connected to the proximal portion of the articulated arm 210.

The articulated arm 210 is constituted by a vertical articulated arm, for example, but is not limited thereto. The articulated arm 210 may be constituted by an articulated arm in other forms such as a horizontal articulated type, an SCARA (Selective Compliance Assembly Robot Arm) type, a frog-leg type, and a parallel link type.

The drive unit 230 is fixed in a gap with the second base frame 412 of the first base 41 and drives the articulated arm 210 and the hand portion 220 on the basis of a control command transmitted from the controller 30. The controller 30 controls operations such as expansion and contraction of the articulated arm 210, turn thereof about the Z axis, and rotation of the hand portion 220. Typically, the controller 30 executes a program stored in a memory of the controller and thus causes the robot main body 200 to operate in a predetermined sequence.

[Clamp Apparatus]

The hand portion 220 is constituted by a clamp apparatus capable of grasping the work W. Hereinafter, the details of the clamp apparatus constituting the hand portion 220 will be described.

Figure 7:
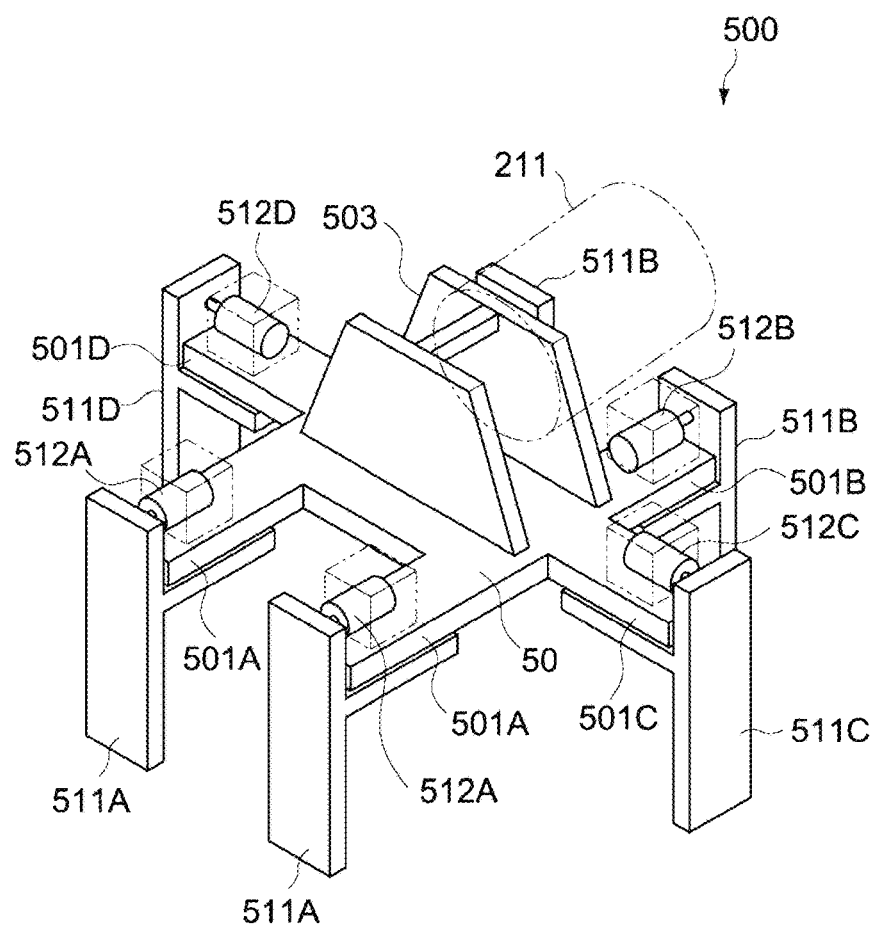
FIG. 7 is a perspective view showing a schematic configuration of a clamp apparatus of a robot main body in the test apparatus.
Figure 7:
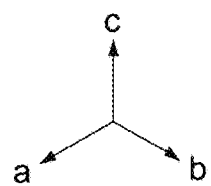
Figure 8:
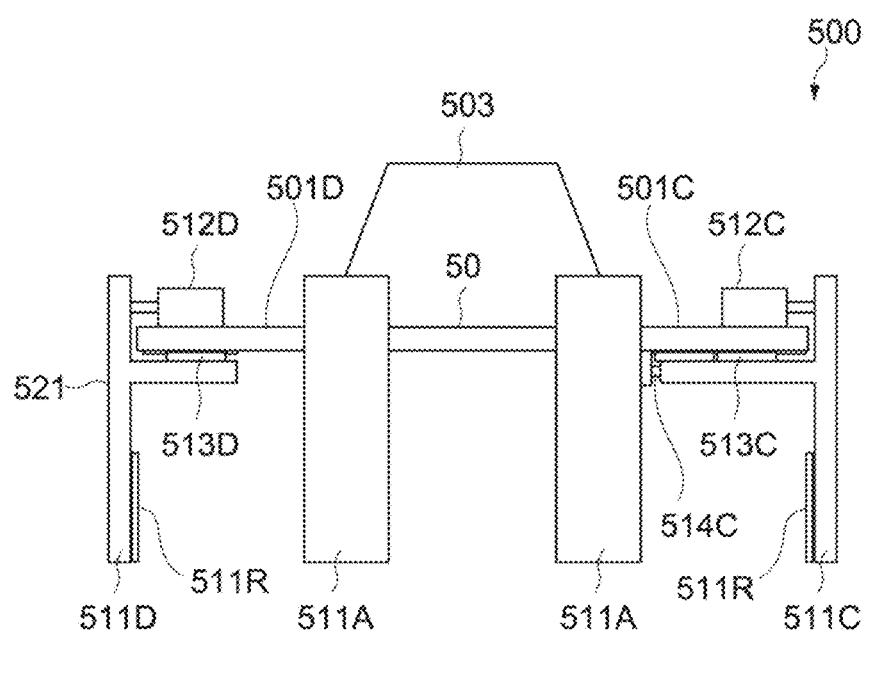
FIG. 8 is a front view of the clamp apparatus.
Figure 8:
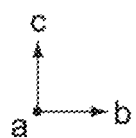
Figure 9:
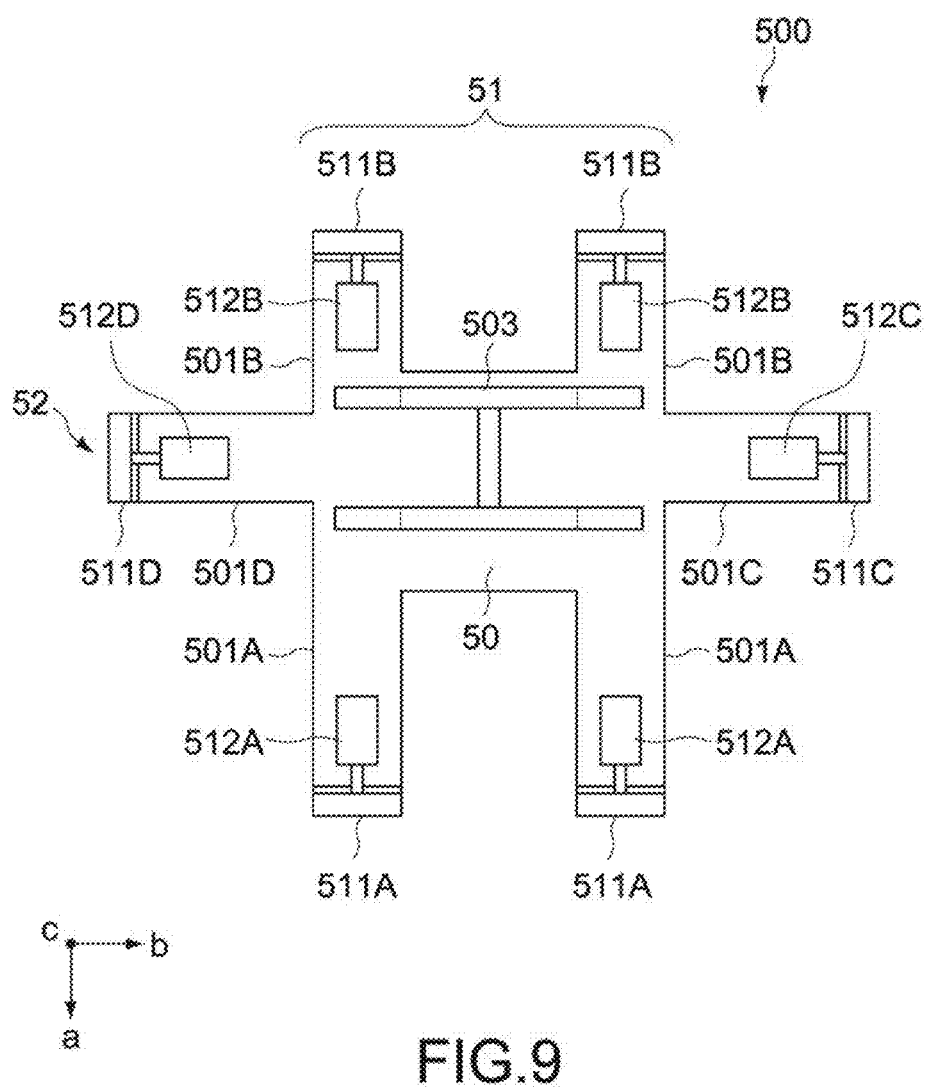
FIG. 9 is a plan view of the clamp apparatus.
Figure 10:
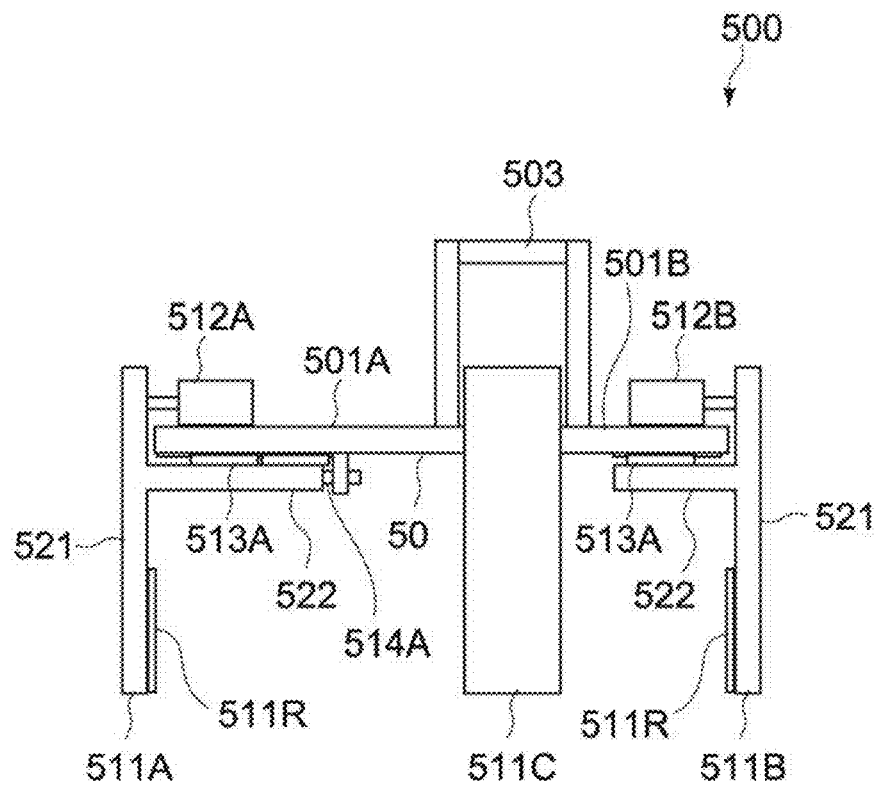
FIG. 10 is a side view of the clamp apparatus.
Figure 10:
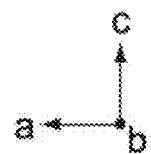
Figure 11:
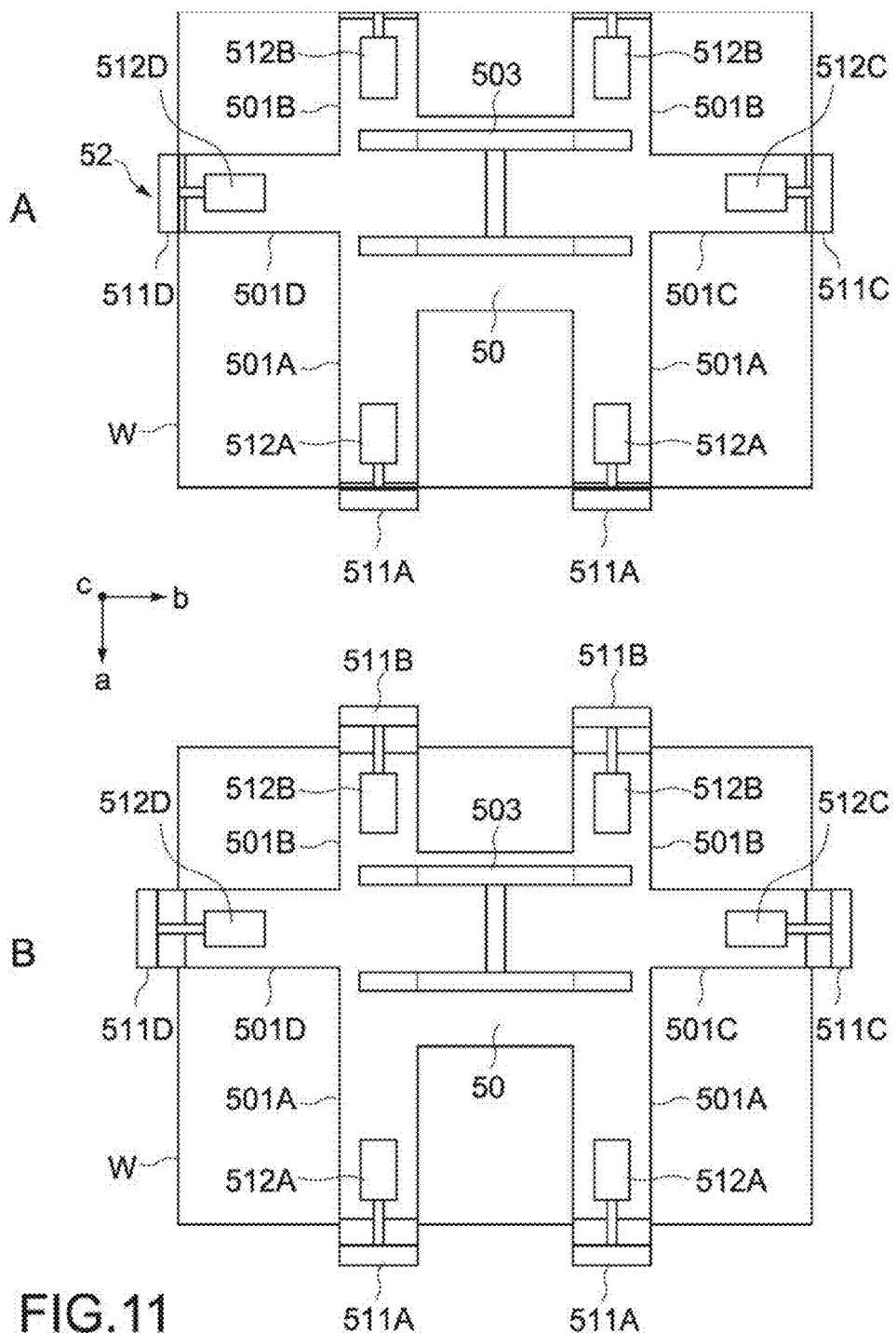
FIG. 11 is a plan view for describing an action of the clamp apparatus.
Figure 12:
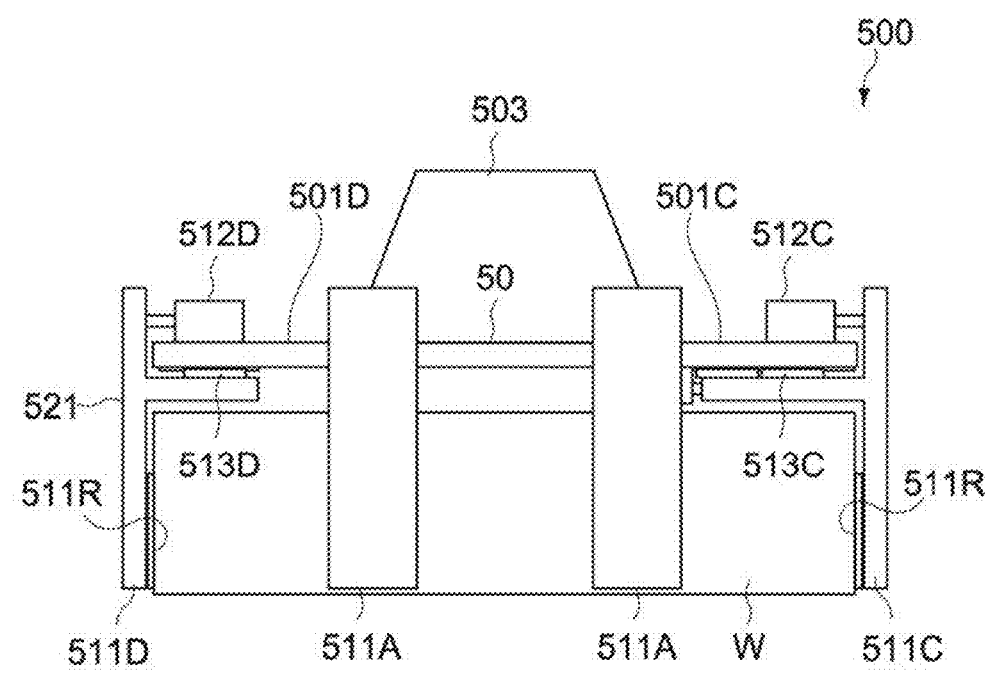
FIG. 12 is a front view for describing an action of the clamp apparatus.
Figure 12:
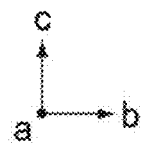

FIGS. 7 to 12 are overall views schematically showing a clamp apparatus 500 constituting the hand portion 220. FIG. 7 is a perspective view, FIG. 8 is a front view, FIG. 9 is a plan view, FIG. 10 is a side view, FIG. 11 is a plan view for describing an action of the clamp apparatus 500, and FIG. 12 is a front view thereof. In each figure, an "a" axis, a "b" axis, and a "c" axis represent three axial directions orthogonal to one another. In particular, an a-axis direction represents a front direction of the clamp apparatus 500.

The clamp apparatus 500 includes a base portion 50, a first clamp unit 51, and a second clamp unit 52.

(Base Portion)

The base portion 50 is constituted by a metal material made of an aluminum alloy or the like and constituted by a plate-like member having a main surface parallel to the a-b plane.

The base portion 50 includes plate-like protruding pieces 501A, 501B, 501C, and 501D that protrude from circumferential edges of the base portion 50 in the a-and b-axis directions. The protruding pieces 501A and the protruding pieces 501B face each other in the a-axis direction, and the protruding piece 501C and the protruding piece 501D face each other in the b-axis direction. The protruding pieces 501A and 501B are formed as two pairs facing each other in the b-axis direction. On the other hand, the protruding pieces 501C and 501D are formed as a pair at a position closer to the protruding pieces 501B.

A connection portion 503 is provided on a main surface of the base portion 50. The connection portion 503 is connected to a tip portion 211 of the articulated arm 210. The connection portion 503 is connected to the tip portion of the articulated arm 210 so as to be rotatable about the a axis.

(First Clamp Unit)

The first clamp unit 51 includes claw portions 511A and 511B (first and second claw portions), drive sources 512A and 512B (first and second drive sources), and linear guides 513A and 513B (first and second linear guides).

The claw portions 511A and the claw portions 511B face each other in the a-axis direction and clamp a work W in the a-axis direction at a first clamping position. The drive sources 512A and the drive sources 512B are connected to the claw portions 511A and the claw portions 511B, respectively, and move the claw portions 511A and 511B to the first clamping position. The linear guides 513A and the linear guides 513B are provided to the base portion 50 and support the claw portions 511A and the claw portions 511B, respectively, so as to be movable with respect to the base portion 50.

The claw portions 511A are attached to the protruding pieces 501A so as to be movable in the a-axis direction. The claw portions 511B are attached to the protruding pieces 501B so as to be movable in the a-axis direction. In this embodiment, the claw portions 511A and the claw portions 511B are formed as two pairs arranged in the b-axis direction.

The claw portions 511A and 511B each include a vertical plate portion 521 and a horizontal plate portion 522. The vertical plate portion 521 has a width direction in the b-axis direction and a longitudinal direction in the c-axis direction. The horizontal plate portion 522 has a width direction in the b-axis direction and a longitudinal direction in the a-axis direction. In a contact area of the inner surface of the vertical plate portion 521 with the work W, for example, an elastic protective layer 511R made of silicone rubber is provided. This makes it possible to enhance adhesiveness between each of the claw portions 511A and 511C and the work W, and prevent the work from being damaged at the time of clamping.

The drive source 512A is fixed to one main surface of the protruding piece 501A (upper surface in FIG. 10) and is coupled to the vertical plate portion 521 of the claw portion 511A via a drive rod that expands and contracts in the a-axis direction. The drive source 512B is fixed to one main surface of the protruding piece 501B (upper surface in FIG. 10) and is coupled to the vertical plate portion of the claw portion 511B via a drive rod that expands and contracts in the a-axis direction. The drive sources 512A and 512B are fixed to or in the vicinity of the end portions of the protruding pieces 501A and 501B, respectively. The drive sources 512A and 512B are each constituted by an air cylinder, but in addition thereto, may be constituted by another actuator such as a hydraulic cylinder or an electric motor.

The linear guide 513A is provided on the other main surface (lower surface in FIG. 10) of the protruding piece 501A. The linear guide 513B is provided on the other main surface (lower surface in FIG. 10) of the protruding piece 501B. The linear guides 513A and 513B are each constituted by a guide rail and a slider. The guide rails are provided to the protruding pieces 501A and 501B and extend in the a-axis direction. The sliders are movable along the guide rails and fixed to the horizontal plate portions 522 of the claw portions 511A and 511B.

(Second Clamp Unit)

On the other hand, the second clamp unit 52 includes claw portions 511C and 511D (third and fourth claw portions), drive sources 512C and 512D (third and fourth drive sources), and linear guides 513C and 513D (third and fourth linear guides).

The claw portion 511C and the claw portion 511D face each other in the b-axis direction and clamp a work W in the b-axis direction at a second clamping position. The drive source 512C and the drive source 512D are coupled to the claw portion 511C and the claw portion 511D, respectively, and move the claw portions 511C and 511D to the second clamping position. The linear guide 513C and the linear guide 513D are provided to the base portion 50 and support the claw portion 511C and the claw portion 511D, respectively, so as to be movable with respect the base portion 50.

The details of the claw portions 511C and 511D, the drive sources 512C and 512D, and the linear guides 513C and 513D are similar to those of the claw portions 511A and 511B, drive sources 512A and 512B, and linear guides 513A and 513B described above, and thus description thereof will be omitted.

[Operation Example of Clamp Apparatus]

The claw portions 511A and the claw portions 511B are configured to be movable by the drive sources 512A and the drive sources 512B, respectively, between the first clamping position (part A of FIG. 11 and FIG. 12) in which the work W is clamped in the a-axis direction and a clamp release position (part B of FIG. 11) in which the above-mentioned clamping action is released. On the other hand, the claw portion 511C and the claw portion 511D are configured to be movable by the drive source 512C and the drive source 512D, respectively, between the second clamping position (part A of FIG. 11 and FIG. 12) in which the work W is clamped in the b-axis direction and the clamp release position (part B of FIG. 11) in which the above-mentioned clamping action is released.

The clamping operations by the first and second clamp units 51 and 52 described above may be performed at the same time or at different timings. Further, a clamping force of each of the clamp units 51 and 52 is not particularly limited as long as a chucking force capable of stably clamping and transferring the work W can be obtained.

In this embodiment, the clamp apparatus 500 can stably clamp the work W by the clamping action from the two axial directions. Further, the claw portions 511A to 511C are driven by the drive sources 512A to 512D independently provided, respectively, and are supported by the protruding pieces 501A to 501D via the linear guides 513A to 513D. This makes it possible to provide high durability with respect to a moment load, which acts on the claw portions 511A to 511D when the work W is clamped. Therefore, according to this embodiment, high accuracy of transfer can be maintained even for a large and weighty work.

Figure 13:
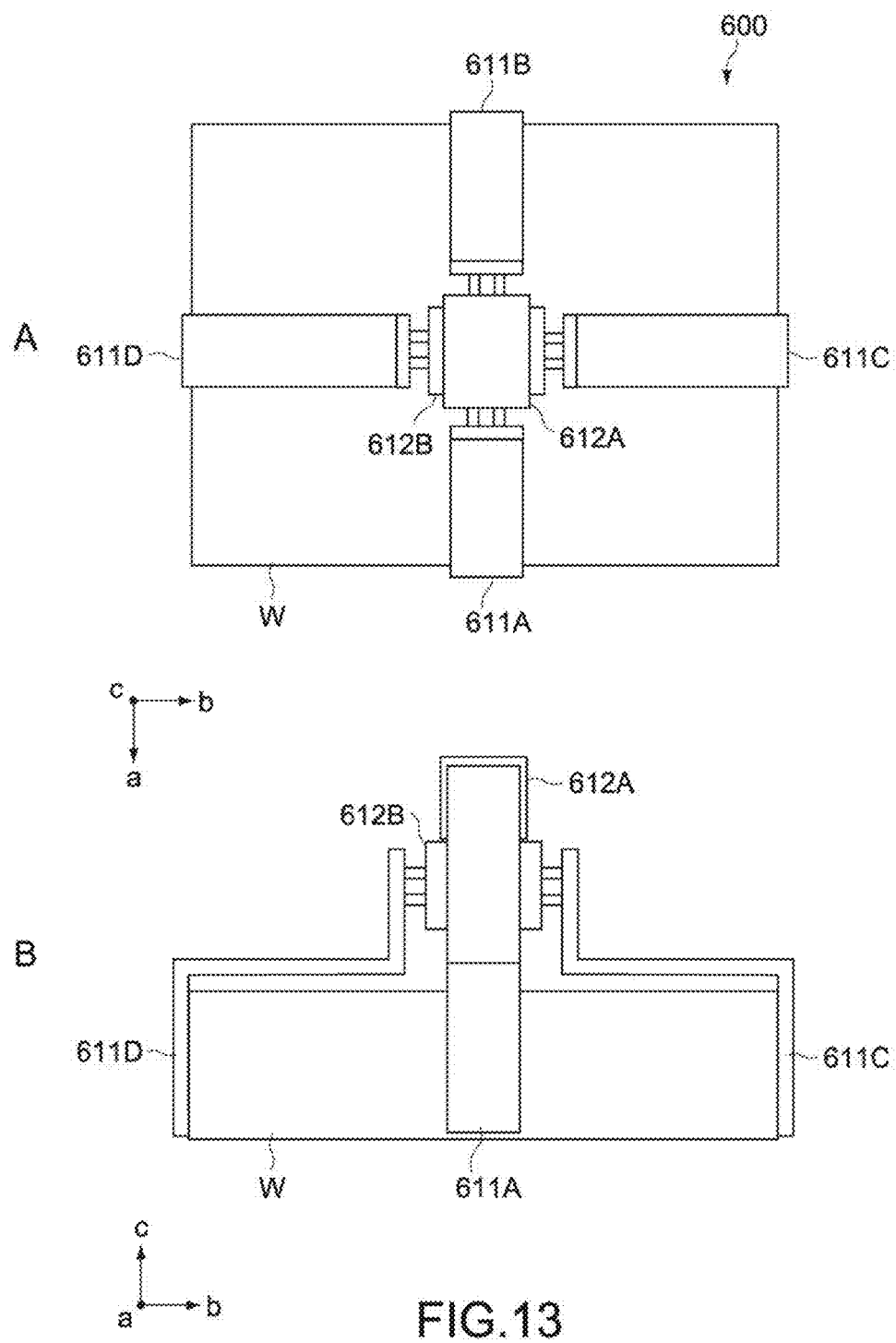
FIG. 13 is a plan view and a front view showing a schematic configuration of a clamp apparatus according to the comparative example.

Part A and part B of FIG. 13 are a plan view and a front view of a schematic configuration of a clamp apparatus 600 according to a comparative example.

The clamp apparatus 600 includes a pair of claw portions 611A and 611B facing each other in the a-axis direction, a pair of claw portions 611C and 611D facing each other in the b-axis direction, a first drive source 612A that commonly drives the pair of claw portions 611A and 611B, and a second drive source 612B that commonly drives the pair of claw portions 611C and 611D. The first and second drive sources 612A and 612B are disposed to face each other in the c-axis direction at the center position of the work W.

In the clamp apparatus 600 according to the comparative example having the configuration described above, a distance from the drive sources 612A and 612B to supported points of the work W in the claw portions 611A to 611D is large, and thus a large moment load is applied to the drive sources 612A and 612B. Thus, if rigidity and strength of the clamp apparatus 600 are low, it is difficult to achieve speed-up of the transfer operation and ensure accuracy of transfer.

In contrast to this, in the clamp apparatus 500 of this embodiment, the drive sources 512A to 512D of the claw portions 511A to 511D are independently provided and fixed to the end portions of the protruding pieces 501A to 501D of the base portion, respectively. For that reason, distances between the drive sources 512A to 512D and the claw portion 511A to 511D can be reduced. Therefore, the moment load applied to the drive sources 512A to 512D can be reduced. This makes it possible to achieve speed-up of the transfer operation and maintain predetermined accuracy of transfer, without extremely increasing rigidity and strength of the base portion 50.

(Clamping Method)

Next, a clamping method for a work by the clamp apparatus 500 according to this embodiment will be described.

Figure 14:
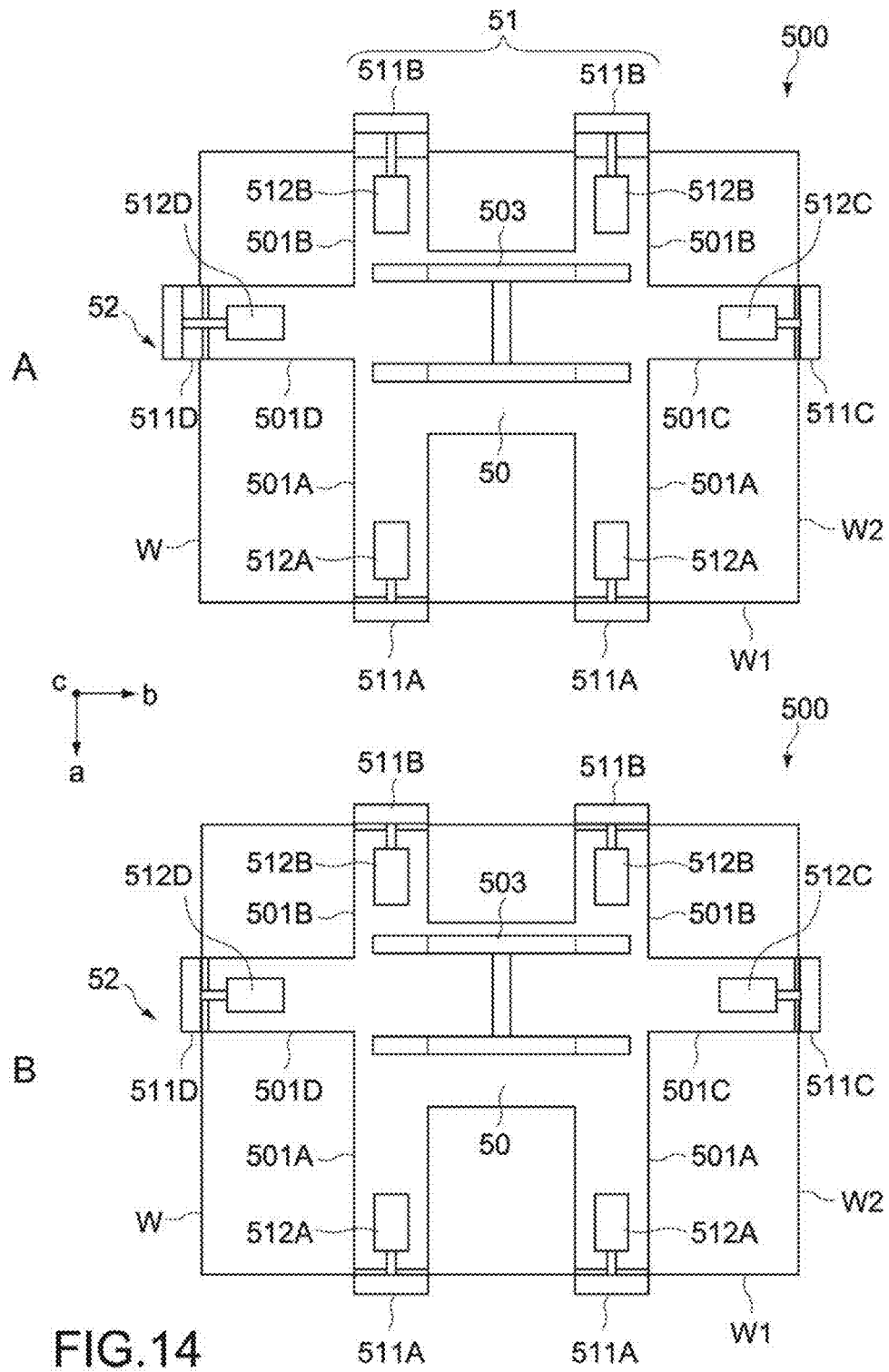
FIG. 14 is a plan view of the clamp apparatus, showing a clamping procedure of a lying work.
Figure 15:
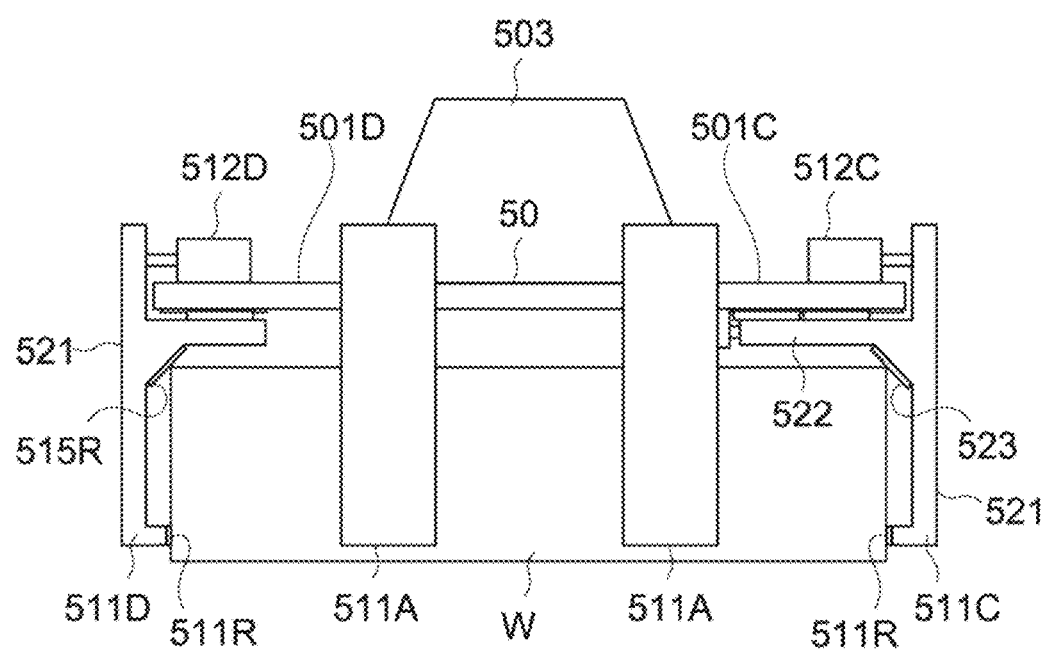
FIG. 15 is a front view showing a modified example of a configuration of the clamp apparatus.

Part A and part B of FIG. 14 are each a plan view of the clamp apparatus 500, showing a clamping procedure of a lying work W.

The claw portions 511A to 511D of the clamp apparatus 500 are disposed by the articulated arm 210 with predetermined gaps therebetween on the circumferential surface of the work W located on the transfer line 20. The clamp apparatus 500 clamps the work W in the procedure shown in part A and part B of FIG. 14.

First, as shown in part A of FIG. 14, the clamp apparatus 500 drives the drive sources 512A and the drive source 512C to move the claw portions 511A and the claw portion 511C, respectively, to the first clamping position and the second clamping position. Subsequently, as shown in part B of FIG. 14, the clamp apparatus 500 drives the drive sources 512B and the drive source 512D to move the remaining claw portions 511B and claw portion 511D, respectively, to the first clamping position and the second clamping position.

Here, in this embodiment, the first and second clamp units 51 and 52 include limiting portions 514A and 514C (first and second limiting portions) that limit the first clamping position of the claw portions 511A and 511C on one side. As shown in FIG. 10, the limiting portion 514A is provided on the other main surface of the protruding piece 501A so as to face the tip of the horizontal plate portion 522 of the claw portion 511A. On the other hand, as shown in FIG. 8, the limiting portion 514C is provided on the other main surface of the protruding piece 501C so as to face the horizontal plate portion 522 of the claw portion 511C.

The first clamping position of the claw portions 511A and 511C are limited, and thus positioning of the work W is enabled with the clamping positions of those claw portions 511A and 511C being as reference. For example, even in the case where the positions of the claw portions 511A to 511C vary with respect to the circumferential surface of the work W before clamping is performed, positioning of two side surfaces W1 and W2 of the work W with respect to the clamp apparatus 500 is performed by the claw portions 511A and 511B. Even if the claw portions 511A and 511C are limited in movement by the limiting portions 514A and 514C before the claw portions 511A and 511C come into contact with the work W, the work W is moved toward the claw portions 511A and 511C by subsequent drive of the claw portions 511B and 511D. Thus, desired accuracy of positioning is ensured.

The driving forces of the drive sources 512A and 512B when the claw portions 511A and 511B are moved to the first clamping position are not limited to be the same and may be different from each other. Similarly, the driving forces of the drive sources 512C and 512D when the claw portions 511C and 511D are moved to the second clamping position are not limited to be the same and may be different from each other.

In this embodiment, the drive sources 512A and 512C on one side are set to have a larger driving force than the drive sources 512B and 512C on the other side. Thus, the claw portions 511A and 511C on one side are configured to be moved toward the first and second clamping positions by a larger driving force than a driving force for the claw portions 511B and 511D on the other side. The difference between the driving force (first driving force) of the drive sources 512A and 512C and the driving force (second driving force) of the drive sources 512B and 512D is not particularly limited. For example, the first driving force is set to be more than 1.5 times as large as the second driving force.

According to the configuration described above, irrespective of whether the claw portions 511A and 511C are in contact with the side surfaces W1 and W2 of the work W, the claw portions 511A and 511C are pressed against the limiting portions 514A and 514C by the first driving force. In this state, the claw portions 511B and 511D press the other side surfaces of the work W by the second driving force. Thus, since the work W is clamped in a state of being constantly pressed against the claw portions 511A and 511C, predetermined accuracy of positioning with respect to the clamp apparatus 500 is also ensured during the transfer.

It should be noted that the claw portions 511A and 511C that support the reference surfaces (W1, W2) of the work W may be designed to have higher rigidity or strength than the other claw portions 511B and 511D by, for example, increasing the number of sliders constituting the linear guides 513A and 513C.

The work W clamped as described above is changed in posture by the articulated arm 210 so as to have a upright posture with the side surface W1 facing downward, and then transferred to a predetermined test position of the work table 100. At that time, a clearance portion is provided at the test position. The clearance portion is capable of housing the claw portions 511A of the clamp apparatus 500. Thus, a clamp release operation after the work W is transferred and placed can be performed. The test unit 300 is electrically connected to the transferred work W and then executes a predetermined test operation.

On the other hand, the test apparatus 10 transfers the tested work W from the work table 100 onto the transfer line 20. At that time as well, the work W on the work table 100 is clamped by the clamp apparatus 500 in the procedure shown in part A and part B of FIG. 14.

Hereinabove, the embodiment of the present technology has been described. However, the present technology is not limited to the embodiment described above and can be variously modified without departing from the gist of the present technology as a matter of course.

For example, in the embodiment described above, the test apparatus that tests an electric operation of a work has been exemplified as an industrial robot. Instead of this, the present technology is applicable to other industrial robots equipped with an assembly unit or welding unit.

Further, in the embodiment described above, the robot main body 200 for transferring works is provided on the first base 41, and the work table 100 that supports the test units 300 and the works W is provided on the second base 42, but the present technology is not limited thereto. For example, also in the case where other apparatuses that are to be vibration sources are provided on the first and second bases, the transmission of vibrations (crosstalk) between both the bases is suppressed. Thus, independent operations in which accuracy is required can be performed on both the bases.

Further, in the embodiment described above, the second base 42 is disposed so as to surround the first base 41, but the layout of both the bases is not particularly limited. The number of bases is also not limited to two. The present technology is applicable to various base structures in which three or more bases are coupled to one another via a coupling frame.

Additionally, the shape of the claw portions 511A to 511C of the clamp apparatus 500 is not limited to the above example. For example, as shown in FIG. 14, the tip of each claw portion may be bent toward the work W. In this case, an inclined surface portion 523 may be provided between the vertical plate portion 521 and the horizontal plate portion 522 of the claw portion, and a protective layer 515R similar to the protective layer 511R may be attached to the surface of the inclined surface portion 523. This makes it possible to limit the height position of the work W and thus improve accuracy in clamping positions of the work W in the three axial directions.

It should be noted that the present technology can have the following configurations.

(1) An industrial robot, including:
a robot main body;
a first base that includes a first upper end portion supporting the robot main body, and a first bottom portion provided on a floor surface;
a second base that includes a second upper end portion on which a plurality of works processed by the robot main body is placed, and a second bottom portion provided on the floor surface; and
a coupling frame that couples the first bottom portion and the second bottom portion to each other.

(2) The industrial robot according to (1), in which
the second base further includes a work table that is provided at the second upper end portion and includes an opening portion, and
the transfer robot is disposed in the opening portion.

(3) The industrial robot according to (2), further including a test unit that is provided on the work table and evaluates the work, in which
the robot main body is a transfer robot that transfers the work to the work table.

(4) The industrial robot according to any one of (1) to (3), in which
at least one of the first bottom portion, the second bottom portion, and the coupling frame is fixed to the floor surface with a bolt.

(5) The industrial robot according to any one of (1) to (4), in which
the first base includes
a first base frame that has a three-dimensional structure including the first bottom portion, and
a second base frame that has a three-dimensional structure including the first upper end portion and configured to be attachable to and detachable from the first base frame.

(6) The industrial robot according to any one of (1) to (5), in which
the robot main body includes an articulated arm.

(7) The industrial robot according to (6), in which
the robot main body further includes a clamp apparatus that is mounted to the articulated arm.

(8) A base unit of an industrial robot, including:
a first base that includes a first upper end portion supporting a robot main body, and a first bottom portion provided on a floor surface;
a second base that includes a second upper end portion on which a plurality of works processed by the robot main body is placed, and a second bottom portion provided on the floor surface; and
a coupling frame that couples the first bottom portion and the second bottom portion to each other.

DESCRIPTION OF SYMBOLS 10 test apparatus
20 transfer line
41 first base
42 second base
43 coupling frame
50 base portion
51 first clamp unit
52 second clamp unit
100 work table
200 robot main body
210 articulated arm
300 test unit
400 base unit
411 first base frame
412 second base frame
500 clamp apparatus
511A to 511D claw portion
511R, 515R protective layer
512A to 512D drive source
513A to 513D linear guide
514A, 514C limiting portion
W work

The invention claimed is:

1. An industrial robot, comprising:
a robot main body;
a first base that includes:
a first base frame including a first bottom portion on a floor surface, and
a second base frame including a first upper end portion configured to support the robot main body,
wherein the first base frame is coupled to the second base frame, and
wherein a height of the first base frame is greater than a height of the second base frame;
a second base that includes:
a second upper end portion,
a second bottom portion on the floor surface, and
a work table at the second upper end portion,
wherein the work table supports a plurality of works processed by the robot main body, and
wherein the work table includes an opening portion in which the robot main body is accommodated such that a gap exists between the opening portion of the work table and the robot main body in order to avoid contact with the work table; and
a coupling frame configured to couple the first bottom portion with the second bottom portion.

2. The industrial robot according to claim 1, further comprising:
a test unit, on the work table, configured to evaluate the plurality of works,
wherein the robot main body is a transfer robot that transfers the plurality of works to the work table.

3. The industrial robot according to claim 1, wherein at least one of the first bottom portion, the second bottom portion, or the coupling frame is fixed to the floor surface with a bolt.

4. The industrial robot according to claim 1, wherein the robot main body includes an articulated arm.

5. The industrial robot according to claim 4, wherein the robot main body further includes a clamp apparatus that is mounted to the articulated arm.

6. A base unit of an industrial robot, comprising:
a first base that includes:
a first base frame including a first bottom portion on a floor surface, and
a second base frame including a first upper end portion configured to support a robot main body,
wherein the first base frame is coupled to the second base frame, and
wherein a height of the first base frame is greater than a height of the second base frame;
a second base that includes:
a second upper end portion,
a second bottom portion on the floor surface, and
a work table at the second upper end portion,
wherein the work table supports a plurality of works processed by the robot main body, and wherein the work table includes an opening portion in which the robot main body is accommodated such that a gap exists between the opening portion of the work table and the robot main body in order to avoid contact with the work table; and a coupling frame configured to couple the first bottom portion with the second bottom portion.

\* \* \* \* \*